US011410802B2

(12) United States Patent
Zäuner et al.

(10) Patent No.: US 11,410,802 B2
(45) Date of Patent: Aug. 9, 2022

(54) ARRANGEMENT FOR NON-REVERSIBLE DETECTION AND DISPLAY OF ELECTRICAL OVERCURRENTS OR CURRENT LIMIT VALUES BY MEANS OF A PRE-FINISHED CONDUCTOR

(71) Applicant: DEHN SE + CO KG, Neumarkt/Opf. (DE)

(72) Inventors: Edmund Zäuner, Berching/Pollanten (DE); Sascha Ludewig, Neumarkt (DE); Georg Wittmann, Lauterhofen (DE)

(73) Assignee: DEHN SE + CO KG, Neumarkt/Opf. (DE)

( * ) Notice: Subject to any disclaimer, the term of this patent is extended or adjusted under 35 U.S.C. 154(b) by 229 days.

(21) Appl. No.: 16/624,571

(22) PCT Filed: Jun. 20, 2018

(86) PCT No.: PCT/EP2018/066422
§ 371 (c)(1),
(2) Date: Dec. 19, 2019

(87) PCT Pub. No.: WO2019/011605
PCT Pub. Date: Jan. 17, 2019

(65) Prior Publication Data

US 2020/0126696 A1 Apr. 23, 2020

(30) Foreign Application Priority Data

Jul. 10, 2017 (DE) ......................... 102017115443.4
Dec. 12, 2017 (DE) ......................... 102017129657.3

(51) Int. Cl.
*H02H 3/08* (2006.01)
*H02H 9/02* (2006.01)
(Continued)

(52) U.S. Cl.
CPC ............... *H01C 7/126* (2013.01); *H01C 7/13* (2013.01); *H01H 37/08* (2013.01); *H01H 71/24* (2013.01)

(58) Field of Classification Search
CPC .......... H01C 7/126; H01C 7/13; H01H 37/08; H01H 71/24
(Continued)

(56) References Cited

U.S. PATENT DOCUMENTS 3,943,473 A 3/1976 Khalid ............................ 335/16
4,041,435 A * 8/1977 Gaia ....................... H01H 85/10
337/159
(Continued)

FOREIGN PATENT DOCUMENTS

DE 102006037551 A1 8/2007 ............... H02H 5/04
DE 102007042991 A1 12/2008 ............... H01C 7/12
(Continued)

OTHER PUBLICATIONS

The Notification Concerning Transmittal of International Preliminary Report on Patentability (Chapter I of the Patent Cooperation Treaty), in English, dated Jan. 23, 2020, which was issued by the International Bureau of WIPO in Applicant's corresponding international PCT application having Serial No. PCT/EP2018/066422, filed on Jun. 20, 2018.
(Continued)

*Primary Examiner* — Jared Fureman
*Assistant Examiner* — Lucy M Thomas
(74) *Attorney, Agent, or Firm* — Bodner & O'Rourke, LLP; Gerald T. Bodner; Christian P. Bodner

(57) ABSTRACT

The invention relates to an arrangement for non-reversible detection and display of electrical overcurrents or current limit values by means of a pre-finished conductor. The conductor according to the invention has at least two con-
(Continued)

ductor sections, spaced apart from each other and extending parallel to each other, which are designed for current to flow through in the same direction. At least one of the parallel conductor sections has a protrusion, a nose, or similar blocking element, which limits the path of movement of a mechanical display or switching element, such that the electromagnetic force acting on the parallel conductor sections during the flow of current transitions the blocking element into a release position in respect of the path of movement of the mechanical display or switching element. Such an arrangement can be used particularly advantageously as a prior damage indicator in surge arresters.

10 Claims, 2 Drawing Sheets

(51) Int. Cl.

| | |
|---|---|
| ***H01C 7/12*** | (2006.01) |
| ***H01C 7/13*** | (2006.01) |
| ***H01H 37/08*** | (2006.01) |
| ***H01H 71/24*** | (2006.01) |

(58) Field of Classification Search
USPC ........................................................ 361/93.1
See application file for complete search history.

(56) References Cited

U.S. PATENT DOCUMENTS

| | | | | | |
|---|---|---|---|---|---|
| 4,204,184 | A * | 5/1980 | Csizy | H01H 85/10 337/159 |
| 5,252,942 | A * | 10/1993 | Gurevich | H01H 85/055 337/163 |
| 5,418,515 | A * | 5/1995 | Reyes | H01H 85/303 337/206 |
| 8,379,362 | B2 | 2/2013 | Kasper | 361/115 |
| 9,640,352 | B2 | 5/2017 | Daum et al. | |
| 2003/0198000 | A1 | 10/2003 | Hinrichsen et al. | 361/139 |
| 2004/0257742 | A1 | 12/2004 | Zeller et al. | 361/118 |
| 2012/0268850 | A1 | 10/2012 | Rainer et al. | 361/56 |

FOREIGN PATENT DOCUMENTS

| | | | | |
|---|---|---|---|---|
| DE | 102008031919 A1 | 1/2010 | H01C 1/14 |
| DE | 102013006052 A1 | 8/2014 | H01T 1/14 |
| GB | 1511881 A | 5/1978 | H01H 71/40 |
| WO | WO2007093572 A1 | 8/2007 | H01C 7/12 |
| WO | WO2009124820 A1 | 10/2009 | H01H 71/04 |
| WO | WO2017148640 A1 | 9/2017 | H01H 71/40 |

OTHER PUBLICATIONS

The English translation of the International Preliminary Report on Patentability (Chapter I of the Patent Cooperation Treaty), dated Jan. 14, 2020, which was issued by the International Bureau of WIPO in Applicant's corresponding international PCT application having Serial No. PCT/EP2018/066422, filed on Jun. 20, 2018.
The Written Opinion of the International Searching Authority, in English, dated Nov. 6, 2018, which was issued by the International Bureau of WIPO in Applicant's corresponding international PCT application having Serial No. PCT/EP2018/066422, filed on Jun. 20, 2018.
The International Search Report, in English, dated Nov. 6, 2018, which was issued by the International Bureau of WIPO in Applicant's corresponding international PCT application having Serial No. PCT/EP2018/066422, filed on Jun. 20, 2018.
An Office Action (in Chinese) and an English translation thereof, dated Feb. 25, 2022, issued by the China National Intellectual Property Administration for Applicant's related Chinese Patent Application No. CN201880046084.9, filed Jun. 20, 2018.

* cited by examiner

ARRANGEMENT FOR NON-REVERSIBLE DETECTION AND DISPLAY OF ELECTRICAL OVERCURRENTS OR CURRENT LIMIT VALUES BY MEANS OF A PRE-FINISHED CONDUCTOR

The invention is based on an arrangement for the non-reversible detection and display of electrical overcurrents or current limit values by means of a pre-finished conductor according to claim 1.

A surge arrester having at least one arresting element, for example, formed as a varistor, is already known from DE 10 2006 037 551 A1.

The already known surge arrester has a disconnection device in order to disconnect one pole or all poles of the arresting element or the arresting elements from the mains.

The respective disconnection device comprises a solder point which is integrated in the electrical connection path within the arrester, wherein, via the solder point, a movable conductor section or a movable conducting bridge is connected to the arresting element, on the one hand, and the conductor section or the bridge is connected to an external electrical connection of the arrester, on the other.

Moreover, at least one spring generating a prestressing force is present, wherein the force vector in this respect acts indirectly or directly upon the conductor section or the bridge in the disconnecting direction.

The core idea of the already known teaching is that a thermally triggerable blocking element blocks the movable conductor section or the movable bridge with respect to the prestressing force vector so that the solder point of the actual disconnection device will not be subjected to a permanent load caused by the force.

In one embodiment, the thermally triggerable blocking element blocks the movement path of a lever transmission as a bolt-like part. In this case, the thermally triggerable blocking element may consist of a low-melting solder as a pre-formed part.

DE 10 2006 037 551 A1 furthermore shows that the activating temperature of the blocking element may be less than the melting temperature of the solder point. Thus, the function of the blocking element, when the temperature rises up into the critical range, is cancelled so that, when the temperature rises further, the disconnection device is triggerable in an unimpeded manner in a failure event. If it is then provided that, when the activating temperature of the blocking element is reached, a lever part covers a first distance so as to get to a stop at the conductor section or the bridge, this covered distance may then be used to trigger a remote signaling contact or an optical display which will signal that a critical temperature increase has already occurred so as to indicate a prior damage of the surge arrester. Thus, the optical display is exclusively thermally activated and therefore only indirectly dependent on the actual current flow through the surge arrester.

Furthermore, arrangements for the non-reversible detection but also for the display of electrical current limit values on the basis of classical fuses or so-called indicator fuses are known. In such known fuses, which have a different inertia in the response behavior depending on the case of application, a fuse wire is inserted in a usually closed housing, which fuses in consideration of the integral $SI^2t/dT$ at a corresponding current load and thus disconnects the respective current path.

Such a disconnection of the current path is also visualized optically in an indicator fuse.

Due to their purpose of use and their construction, fuses basically can be regarded as irreversible current detectors.

Known load or wear displays in the field of surge protection have the common disadvantage that the display itself reacts very inaccurately, since the focus is merely a dependence with respect to the thermal behavior of the employed surge arrester, e.g. a varistor. This thermal behavior depends not only on the current flow and the instantaneous load but also on the ambient temperature, i.e. the conditions of use.

From the aforementioned, it is therefore a task of the invention to propose a further developed arrangement for non-reversible detection and display of electrical overcurrents or current limit values while referring to a pre-finished conductor which does not react on the basis of the heating of the current-carrying conductor and thus does react indirectly, but reacts directly to the current flow itself so that external influences such as ambient temperatures, installation conditions and influences by adjacent constructional device parts or components can be avoided.

The solution of the task of the invention is performed by an arrangement according to the feature combination of claim 1, as well as by a use of the teaching according to claim 10, the dependent claims representing at least appropriate configurations and further developments.

Accordingly, an arrangement for the non-reversible detection but also for the display of electrical overcurrents or current limit values based on a pre-finished conductor is taken as a basis.

The conductor has at least two conductor sections that are spaced apart from each other and extend in parallel to each other, which are designed for current to flow through the two parallel conductor sections in the same direction.

At least one of the parallel conductor sections has a protrusion, a nose, or similar blocking element, which limits the path of movement of a mechanical display or switching element.

This limitation of the path of movement is performed such that the electromagnetic force acting upon the parallel, current-carrying conductor sections transfers the blocking element into a release position in respect of the path of movement of the mechanical display or switching element.

The latter is realized in that the electromagnetic force acting upon the parallel, current-carrying conductors results in the fact that the conductors attract each other, that means move toward each other. This movement changes the original position of the blocking element so that the blocking function may be cancelled.

In one embodiment of the invention, the blocking element may be formed as a simple stop.

The blocking element may be realized, for example, by embossing or punching for the purpose of deformation of a corresponding area of the conductor sections.

In a preferred implementation of the inventive idea, the conductor is formed as a tape conductor, flat conductor or strip conductor which has a two-dimensional middle section converging in two parallel conductor strips.

Such a flat conductor can be produced very easily in a reproducible manner and at low cost using classic punching technology.

Independent of the fact that primarily the relative movement of the conductor sections due to current flow and electromagnetic force is important in the approach according to the invention, the conductor sections extending in parallel may be formed such with respect to the remaining cross-section of the conductor that a safety function in terms of a fuse is ensured, when a further increase of the current flow occurs in the corresponding conductor branch.

In this case, it is understood that the two-dimensional conductors are configured in the middle section to be mechanically rigid and so stable that the effect of the shape-matched or mounted blocking element will be maintained also during usual mechanical loads.

In a preferred embodiment, a displaceable sleeve is supported on the conductor.

The sleeve's path of displacement is limited by the blocking element, with the blocking element releasing the path of displacement when a current flow limit value is reached, namely as a consequence of the electromagnetic force acting upon the parallel conductor strips.

The sleeve may now serve indirectly as a status indicator, in that the displacement of the sleeve or a color change associated therewith is recognizable, for example, via a viewing window.

As an alternative, the sleeve may also actuate indirectly a status display or an electrical switching device, for example, a remote signaling device, via a lever mechanism.

Basically, there is the additional possibility for an electrical switch of the known kind to be triggerable by means of the sleeve and, if necessary, a lever mechanism.

The sleeve is applied with a prestressing force in the direction of the path of displacement in order to provide the necessary energy for carrying out the movement or for actuating a lever mechanism.

Varying the cross-section and the spacing of the conductor sections extending in parallel allows the response sensitivity to be adjusted and a corresponding surge current limit value to be defined, at which the electromagnetic force upon the conductors will become so large that a deformation and release of the path of movement of the display or switching element can be performed.

The use of the presented arrangement as a load or prior damage display of an overcurrent arrester is also part of the invention.

In this respect, the conductor is formed as a part of the internal electrical connection or wiring of the surge arrester or will be correspondingly inserted in a surge arrester. A so-called traffic light display may then be realized by means of the arrangement according to the invention. In this case, the color green of a corresponding display device, for example, symbolizes that the employed surge arrester is fully operable and has no prior damages.

When the arrangement comprising two parallel, current-carrying conductors according to the above description is triggered, the display changes to "yellow". This signalizes that the prior damage current detection has responded.

Furthermore, with the response of a further classical thermal disconnection device and a transition to the color red, it may be signalized that a failure of the protection element employed in the surge arrester, for example, a varistor, has occurred.

The invention will be explained in more detail below on the basis of an exemplary embodiment and referring to Figures.

Shown are in:

FIG. 1 a principle representation of the conductor according to the invention, comprising at least two conductor sections spaced apart from each other and extending in parallel to each other, through which current flows in the same direction in the case of use;

FIG. 2 a principle representation of an exemplary embodiment of the arrangement according to the invention with a sleeve and a lever mechanism, which is in communication with a display slide; and FIGS. 3 to 5 an embodiment of a surge arrester, formed here as a plug-in part having an integrated arrangement for the non-reversible detection and display of an overcurrent load in terms of a potential prior damage, wherein FIG. 3 symbolizes des status "no prior damage" (green), FIG. 4 symbolizes the status "prior damage occurred" (yellow), and FIG. 5 symbolizes the status "red", "thermal disconnection device has triggered".

The arrangement according to the invention for the non-reversible detection and display of overcurrents and current limit values is based on a pre-finished conductor which can be produced, for example, by punching as a flat or tape conductor according to FIG. 1.

In its middle section, the conductor 1 has two conductor sections 2; 3 spaced apart from each other and extending in parallel to each other.

These are configured such that, when the conductor 1 is coupled into a power circuit, current will flow through the conductor sections 2; 3 in the same direction.

According to FIG. 1, both conductor sections 2; 3 each have a nose 4; 5.

These noses 4; 5 act as a blocking element, for example, for limiting a path of displacement of a mechanical display or switching element (see FIG. 2).

During a current flow I, an electromagnetic force F acts upon the parallel conductor sections 2; 3.

As a consequence, the conductor sections 2; 3 attract each other, and the blocking elements 4; 5 reach a release position (here, as well, see FIG. 2).

In the principle representation according to FIG. 2, the explained conductor 1 having the parallel conductor sections 2; 3 together with the nose or blocking element 5 can be found again.

The blocking element 5 is realized here as a stop with respect to a displaceable sleeve 6.

The sleeve 6 is prestressed with respect to a fixed point 8 by means of a spring element 7.

Via a lever mechanism 9, the sleeve 6 is in communication with a status display 10.

When upon reaching a current limit value the electromagnetic force F upon the parallel, current-carrying conductors 2; 3 becomes so large that these attract each other, the nose 5 gets into a position such that the path of displacement of the sleeve 6 will be open.

Consequently, the sleeve 6 will move toward the fixed point 8 while using the spring force 7. As a result, the display will displace while using the lever 9.

The display may now signalize the relevant load situation that has occurred, via a window or similar arrangement not shown in FIG. 2.

There is likewise the option for a remote signaling device not shown or an electrical switch to be operated, for example, triggered via the lever mechanism 9.

FIGS. 3 to 5 show a surge arrester formed as a plug-in part. For better visibility of the arrangement according to the invention, the relevant cover has been omitted in the representation of the plug-in part 11.

From FIGS. 3 to 5 it is apparent how the special conductor arrangement has been coupled into the current path of the surge arrester starting from the plug connections 22 and 23.

The lever mechanism 9 and the sleeve 6, which is mounted to be displaceable on the conductor 1, are also visible.

Figure 1:
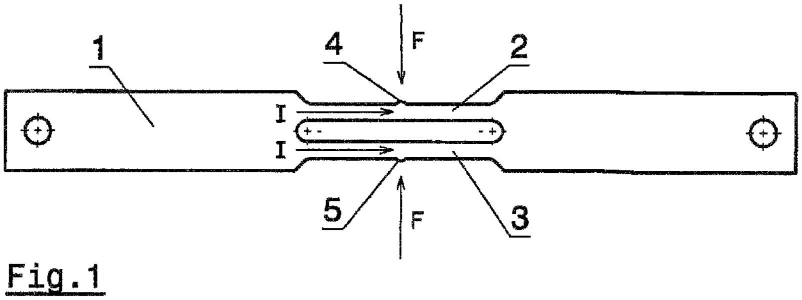
Figure 2:
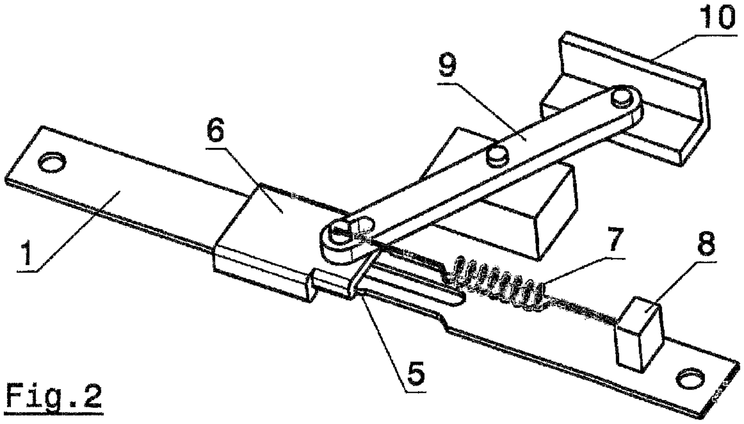

The lever mechanism 9 releases the slide 12 which is under spring force. The slide 12 travels downward. The yellow display 13 is released with respect to the viewing window 14.

At the same time, the slide 12 actuates a further slide 15 which is capable of controlling a remote signaling unit 16.

Figure 5:
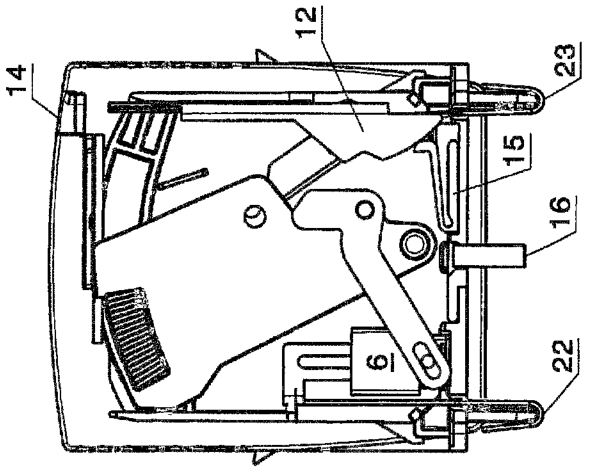
Figure 4:
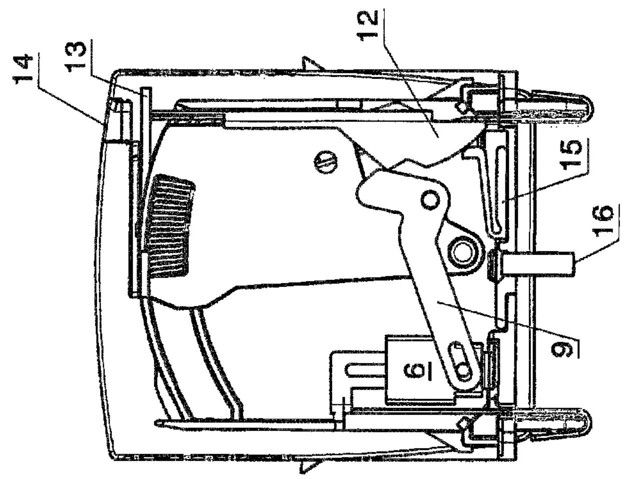
FIG. 4 is related to the status of an already occurred prior damage due to current. By a deformation of the conductor sections 2; 3, the sleeve 6 reaches a lower end position.
Figure 3:
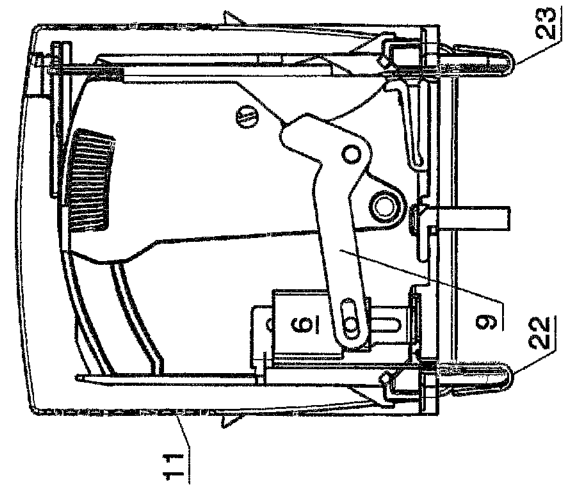
FIG. 3 shows the status "green", what means that prior damages have not occurred so far.

When, as shown in FIG. 5, the thermal disconnection device, which is configured in a known manner, has responded due to an overload of the actual surge arrester, the yellow display 13 will be moved to the left in the representation according to FIG. 5, and the display "red" will be visible in the viewing window.

The invention claimed is:

1. An arrangement for the non-reversible detection and display of electrical overcurrents or current limit values by means of a pre-finished conductor, characterized in that the conductor (1) has at least two conductor sections (2; 3) that are spaced apart from each other and extend in parallel to each other, which are designed for current to flow through in the same direction, at least one of the parallel conductor sections (2; 3) has a protrusion, a nose, or similar blocking element (4; 5), which limits the path of movement of a mechanical display or switching element such that the electromagnetic force (F) acting upon the parallel conductor sections (2; 3) during the flow of current (I) transitions the blocking element into a release position in respect of the path of movement of the mechanical display or switching element.

2. The arrangement according to claim 1, characterized in that the blocking element (4; 5) is formed as a stop.

3. The arrangement according to claim 1, characterized in that the blocking element is a deformation of the parallel conductor sections (2; 3) realized by embossing or punching.

4. The arrangement according to claim 1, characterized in that the conductor (1) is formed as a flat conductor or tape conductor which has a two-dimensional middle section merging into two parallel conductor stripes.

5. The arrangement according to claim 4, characterized in that a displaceable sleeve (6) is mounted on the conductor (1).

6. The arrangement according to claim 5, characterized in that the path of displacement of the sleeve (6) is limited by the blocking element (4; 5), wherein the blocking element (4; 5) releases the path of displacement of the sleeve (6) when a current flow limit value (I) is reached.

7. The arrangement according to claim 5, characterized in that the sleeve (6) actuates a status display (10) indirectly or directly via a lever mechanism (9).

8. The arrangement according to claim 5, characterized in that the sleeve (6) is subjected to a prestressing force (7; 8) in the direction of the path of displacement.

9. The arrangement according to claim 1, characterized in that varying the cross-section and the spacing of the conductor sections (2; 3) extending in parallel allows the response sensitivity to be adjusted and a corresponding surge current limit value to be defined.

10. The arrangement according to claim 1, characterized by its use as a load or prior damage display of a surge arrester (11), wherein the conductor (1) is in this case formed as a part of an internal electrical wiring or connection of the surge arrester.

* * * * *